(12) United States Patent
Gysling

(10) Patent No.: US 11,940,309 B2
(45) Date of Patent: Mar. 26, 2024

(54) METHOD FOR DETERMINING A FLUID FLOW PARAMETER WITHIN A VIBRATING TUBE

(71) Applicant: Expro Meters, Inc., Wallingford, CT (US)

(72) Inventor: Daniel L. Gysling, South Glastonbury, CT (US)

(73) Assignee: EXPRO METERS, INC., Wallingford, CT (US)

( * ) Notice: Subject to any disclaimer, the term of this patent is extended or adjusted under 35 U.S.C. 154(b) by 142 days.

(21) Appl. No.: 17/322,377

(22) Filed: May 17, 2021

(65) Prior Publication Data

US 2021/0356307 A1    Nov. 18, 2021

Related U.S. Application Data

(60) Provisional application No. 63/025,668, filed on May 15, 2020.

(51) Int. Cl.
 *G01F 1/84* (2006.01)
(52) U.S. Cl.
 CPC .......... *G01F 1/8436* (2013.01); *G01F 1/8422* (2013.01); *G01F 1/8427* (2013.01); *G01F 1/8477* (2013.01)
(58) Field of Classification Search
 CPC .... G01F 1/8436; G01F 1/8422; G01F 1/8427; G01F 1/8477
 USPC ..................................................... 73/861.356
 See application file for complete search history.

(56) References Cited

U.S. PATENT DOCUMENTS

| 4,831,885 A | * | 5/1989 | Dahlin ................. G01F 1/8495 138/30 |
| 4,996,871 A | * | 3/1991 | Romano ............... G01F 1/8431 73/32 A |
| 6,505,519 B2 | | 1/2003 | Henry |
| 7,059,199 B2 | | 6/2006 | Mattar |

(Continued)

FOREIGN PATENT DOCUMENTS

| DE | 102016114972 A1 | 2/2018 |
| WO | 0171291 B1 | 9/2001 |

OTHER PUBLICATIONS

International search report for PCT/US2021/032752 dated Aug. 2, 2021.

*Primary Examiner* — Alexander A Mercado
*Assistant Examiner* — Rodney T Frank
(74) *Attorney, Agent, or Firm* — Getz Balich LLC

(57) ABSTRACT

An apparatus for use with a Coriolis meter is provided. The apparatus includes an array of strain-based sensors, a filtering module, and a processing unit. The sensor array is configured for sensing a meter flow tube. The array is configured for mounting on the flow tube. The sensors are configured to produce sensor signals representative of strain within the flow tube. The processing unit controls the sensor array to produce the sensor signals representative of the strain within the flow tube. The strain includes a first portion associated with the flow tube vibrating at a resonant frequency of the flow tube and a second portion associated with a fluid flow passing through the flow tube. The filtering module filters the sensor signals to remove a sensor signal portion representative of the strain associated with the flow tube vibrating at the resonant frequency of the flow tube.

8 Claims, 11 Drawing Sheets

(56) References Cited

U.S. PATENT DOCUMENTS

| | | | |
|---|---|---|---|
| 7,134,320 B2 | 11/2006 | Gysling | |
| 7,152,460 B2 | 12/2006 | Gysling | |
| 7,165,464 B2 | 1/2007 | Gysling | |
| 7,188,534 B2 | 3/2007 | Tombs | |
| 7,299,705 B2 | 11/2007 | Gysling | |
| 7,322,245 B2 * | 1/2008 | Gysling | G01N 29/46 73/61.79 |
| 7,328,113 B2 | 2/2008 | Rothman | |
| 7,343,820 B2 | 3/2008 | Gysling | |
| 7,360,452 B2 | 4/2008 | Rieder | |
| 7,360,453 B2 | 4/2008 | Rieder | |
| 7,363,800 B2 | 4/2008 | Gysling | |
| 7,380,438 B2 | 6/2008 | Gysling | |
| 7,380,439 B2 | 6/2008 | Gysling | |
| 7,389,687 B2 | 6/2008 | Gysling | |
| 7,412,903 B2 | 8/2008 | Rieder | |
| 7,526,966 B2 | 5/2009 | Gysling | |
| 7,596,987 B2 | 10/2009 | Gysling | |
| 7,793,555 B2 | 9/2010 | Gysling | |
| 8,061,186 B2 | 11/2011 | Gysling | |
| 8,289,179 B2 | 10/2012 | Weinstein | |
| 8,327,717 B2 | 12/2012 | Weinstein | |
| 8,641,813 B2 | 2/2014 | Gysling | |
| 10,718,648 B2 | 7/2020 | Zhu | |
| 2002/0129662 A1 | 9/2002 | Gysling | |
| 2004/0226386 A1 * | 11/2004 | Gysling | G01F 1/7082 73/861.42 |
| 2005/0044929 A1 * | 3/2005 | Gysling | G01F 1/8477 73/32 A |
| 2005/0061060 A1 * | 3/2005 | Gysling | G01F 1/849 73/32 R |
| 2006/0169058 A1 * | 8/2006 | Gysling | G01N 9/002 73/861.355 |
| 2007/0006640 A1 | 1/2007 | Gysling | |
| 2007/0055464 A1 * | 3/2007 | Gysling | G01F 1/74 702/50 |
| 2010/0139416 A1 * | 6/2010 | Kolahi | G01F 1/8495 73/861.357 |
| 2020/0271494 A1 | 8/2020 | Zhu | |

* cited by examiner

METHOD FOR DETERMINING A FLUID FLOW PARAMETER WITHIN A VIBRATING TUBE

This application claims priority to U.S. Patent Application No. 63/025,668 filed May 15, 2020, which application is incorporated by reference herein in its entirety.

BACKGROUND OF THE INVENTION

1. Technical Field

The present disclosure is related to fluid flow sensing devices that utilize vibrating tubes in general, and to methods for improving fluid flow sensing in a fluid flow sensing device that utilizes vibrating tubes.

2. Background Information

The use of an array of strain-based sensors on the flow tubes of a Coriolis flow meter to measure the speed of sound propagating within the process fluid is known. The speed of sound measurement, used in conjunction with the other measurements measured on a Coriolis meter, can improve the accuracy of the Coriolis meter for certain fluid flows. Specifically, the speed of sound provides a means to determine gas void fraction using the so-called Wood's equation to relate mixture and component densities and sound speeds.

To measure the speed of sound, some prior art detects strain induced in sensors attached to a fluid conveying conduit (hereinafter "conduit") that is associated with a propagating sound field. The sound field is typically generated within the process fluid, external to the region of the conduit where the strain sensors 26 are disposed. The sound field propagates within the fluid passing within the conduit where the strain sensors 26 are disposed; i.e., the strain sensors 26 sense the fluid to detect the sound field as the fluid passes by the sensors. Accurately measuring the propagation speed of sound relies on the sensors having a signal to noise ratio (SNR) great enough to permit detection of the often low amplitude acoustic waves within the sound field in the presence of other noise sources, such as structural vibration and electrical noise.

What is needed is a system and/or method that enhances the ability of an array of strain-based sensors to measure acoustic signals within a fluid passing within a fluid flow meter having a vibratable tube such as a Coriolis meter.

SUMMARY

According to an aspect of the present disclosure an apparatus for use with a Coriolis meter is provided. The Coriolis meter has at least one flow tube configured to contain a fluid flow there through, a drive coil in communication with the flow tube and configured to cause the flow tube to vibrate at at least one a resonant frequency while the fluid flow passes there through, and at least one tube motion sensor configured to sense vibratory motion of the flow tube. The apparatus includes an array of strain-based sensors, an electronic filtering module, and a sensor array processing unit. The array of strain-based sensors is configured for sensing a flow tube of a Coriolis meter. The array has at least one first strain-based sensor and at least one second strain based sensor, the array configured for mounting on the flow tube with the at least one first strain-based sensor disposed at a first axial position and the at least one second strain based sensor disposed at a second axial position, the first axial position and the second axial position spaced apart from one another, and the strain-based sensors are configured to produce sensor signals representative of an amount of strain within the flow tube. The sensor array processing unit has a processor and is in communication with the sensor array and a memory device storing executable instructions. The instructions when executed cause the processor to control the sensor array to produce the sensor signals representative of the amount of strain within the flow tube. The amount of strain includes a first portion associated with the flow tube vibrating at at least one resonant frequency of the flow tube containing the fluid flow and a second portion associated with a fluid flow passing through the flow tube of the Coriolis meter. The electronic filtering module is in communication with the sensor array and the Coriolis meter, and is configured to filter the sensor signals to remove a first sensor signal portion representative of the strain first portion associated with the flow tube vibrating at the at least one resonant frequency of the flow tube containing the fluid flow.

In any of the aspects or embodiments described above and herein, the electronic filtering module may be configured to receive signal input from the Coriolis meter, and to filter the sensor signals using the signal input from the Coriolis meter.

In any of the aspects or embodiments described above and herein, the signal input from the Coriolis meter may be based on a drive coil signal, a tube motion sensor signal, a produced signal, or a sensor signal.

In any of the aspects or embodiments described above and herein, the electronic filtering module may be configured to filter the sensor signals using a sine projection and a cosine projection. In those embodiments, the cosine projection may be $F(t)=p(t)\cos(2\pi f_{tone}t)$ and the sine projection may be $G(t)=p(t)\sin(2\pi f_{tone}t)$ where $p(t)$ represents the sensor signals and $f_{tone}$ is one of the at least one resonant frequency of the flow tube.

In any of the aspects or embodiments described above and herein, the electronic filtering module may produce filtered signals representative of the sensor signals filtered to remove the first sensor signal portion representative of the strain first portion associated with the flow tube vibrating at the at least one resonant frequency of the flow tube, and the sensor array processing unit may be configured to produce a fluid flow parameter using the filtered signals. In those embodiments, the fluid flow parameter may be a speed of sound in the fluid flow or a convective velocity of the fluid flow, or other fluid flow parameter.

In any of the aspects or embodiments described above and herein, the electronic filtering module may utilize an analog circuit to remove the first sensor signal portion representative of the strain first portion associated with the flow tube vibrating at the at least one resonant frequency of the flow tube.

According to another aspect of the present disclosure, a Coriolis meter is provided that includes at least one flow tube, a drive coil, at least one tube motion sensor, an array of strain-based sensors, an electronic filtering module, and a sensor array processing unit. The flow tube is configured to contain a fluid flow there through. The drive coil is in communication with the flow tube and configured to cause the flow tube to vibrate at at least one resonant frequency. The at least one tube motion sensor is configured to sense vibratory motion of the flow tube. The array of strain-based sensors is configured for sensing the flow tube. The array has at least one first strain-based sensor and at least one second strain based sensor. The array is mounted on the flow tube with the at least one first strain-based sensor disposed at a first axial position and the at least one second strain based sensor disposed at a second axial position, the first axial position and the second axial position spaced apart from one another. The strain-based sensors are configured to produce sensor signals representative of an amount of strain within the flow tube. The sensor array processing unit has a processor and is in communication with the array of sensors and a memory device storing executable instructions. The instructions when executed cause the processor to control the array of strain-based sensors to produce the sensor signals representative of the amount of strain within the flow tube. The amount of strain includes a first portion associated with the flow tube vibrating at at least one resonant frequency of the flow tube containing the fluid flow and a second portion associated with a fluid flow passing through the flow tube of the Coriolis meter. The electronic filtering module is in communication with the sensor array and is configured to filter the sensor signals to remove a first sensor signal portion representative of the strain first portion associated with the flow tube vibrating at the at least one resonant frequency of the flow tube containing the fluid flow.

According to another aspect of the present disclosure, a system is provided that includes a Coriolis meter, a flow meter, and a system processing unit. The Coriolis meter has at least one flow tube configured to contain a fluid flow there through, a drive coil in communication with the flow tube and configured to cause the flow tube to vibrate at at least one resonant frequency, at least one tube motion sensor configured to sense vibratory motion of the flow tube, and a Coriolis meter processing unit. The flow meter has an array of strain-based sensors and a sensor array processing unit. The array of strain-based sensors is disposed on the flow tube of the Coriolis meter. The array has at least one first strain-based sensor and at least one second strain based sensor. The at least one first strain-based sensor is disposed at a first axial position on the flow tube and the at least one second strain based sensor is disposed at a second axial position on the flow tube. The first axial position and the second axial position are spaced apart from one another. The strain-based sensors are configured to produce sensor signals representative of an amount of strain within the flow tube. The sensor array processing unit has a processor in communication with the sensor array and a memory device storing executable instructions. The instructions when executed cause the processor to control the array of strain-based sensors to produce the sensor signals representative of the amount of strain within the flow tube. The amount of strain includes a first portion associated with the flow tube vibrating at at least one resonant frequency of the flow tube containing the fluid flow and a second portion associated with a fluid flow passing through the flow tube of the Coriolis meter. The system processing unit is in communication with the Coriolis meter processing unit and the sensor array processing unit. The system processing unit includes an electronic filtering module in communication with the sensor array processing unit and the Coriolis meter processing unit. The electronic filtering module is configured to filter the sensor signals to remove a first sensor signal portion representative of the strain first portion associated with the flow tube vibrating at the at least one resonant frequency of the flow tube containing the fluid flow.

According to another aspect of the present disclosure a method of sensing fluid flow within a tube is provided. The method includes: a) controlling a transducer to vibrationally drive at least a portion of a flow tube at at least one resonant frequency of the flow tube while a fluid flow is passing through the flow tube; b) using a sensor array processing unit in communication with an array of strain-based sensors disposed on the flow tube to produce sensor signals representative of an amount of strain within the flow tube, the amount of strain including a first portion associated with the at least a portion of the flow tube vibrating at the at least one resonant frequency while the fluid flow is passing through the flow tube and a second portion associated with a fluid flow passing through the flow tube; and c) filtering the sensor signals received from the sensor array processing unit to produce filtered sensor signals, the filtering using an electronic filtering module to remove a first sensor signal portion from the sensor signals, the first sensor signal portion representative of the strain first portion associated with the at least said portion of the flow tube vibrating at the at least one resonant frequency of the flow tube containing the fluid flow.

In any of the aspects or embodiments described above and herein, the filtering step may utilize signal input from the transducer that vibrationally drives at least said portion of said tube at said at least one resonant frequency, or the filtering step may utilize signal input from at least one tube motion sensor configured to sense vibratory motion of the at least said portion of the flow tube, or may utilize a produced signal, or may utilize a sensor signal.

In any of the aspects or embodiments described above and herein, the filtering step may include producing a sine projection of said sensor signals at said at least one resonant frequency and a cosine projection of said sensor signals at said at least one resonant frequency. In these embodiments, the cosine projection may be $F(t)=p(t)\cos(2\pi f_{tone}t)$ and the sine projection may be $G(t)=p(t)\sin(2\pi f_{tone}t)$, where $p(t)$ represents the sensor signals and one of the at least one resonant frequency of the flow tube.

In any of the aspects or embodiments described above and herein, the method may further include producing one or more fluid flow parameters using the filtered sensor signals. In these embodiments, the fluid flow parameter may be a speed of sound, or a convective velocity, or other fluid flow parameter of the fluid flow.

In any of the aspects or embodiments described above and herein, the electronic filtering module may utilize an analog circuit to remove the first sensor signal portion representative of the strain first portion associated with the at least said portion of the flow tube vibrating at the at least one resonant frequency.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
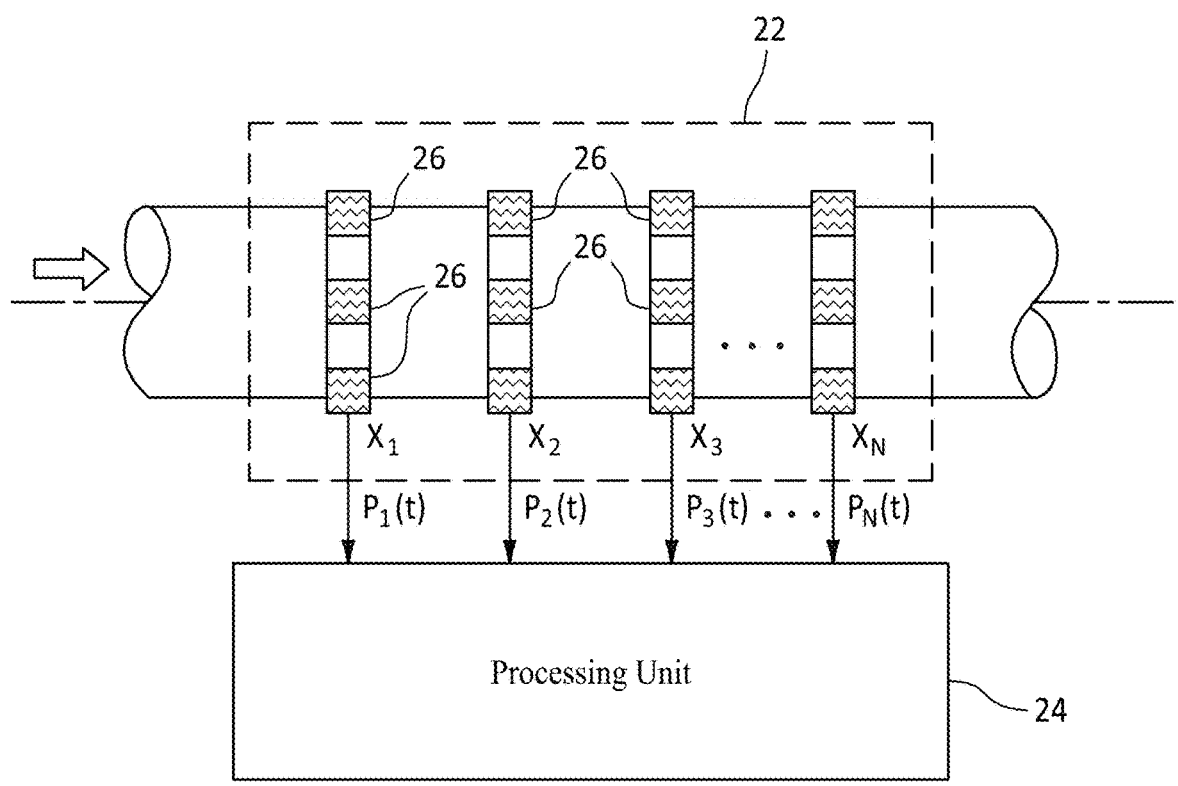
FIG. 1 is a diagrammatic illustration of a strain sensor array attached to a pipe with the array in communication with a strain sensor processing unit.

The present disclosure is directed to a system 20 and method for measuring one or more fluid parameters (e.g., speed of sound (SOS), convective velocity, etc.) of a fluid flow disposed within a flow meter having one or more vibratable tubes such as a Coriolis meter. According to aspects of the present disclosure, the system 20 may include an array 22 of strain sensors 26 and a sensor array processing unit ("SA processing unit 24"—see FIG. 1). The strain sensors 26 are configurable to be applied to an exterior surface of a conduit (hereinafter referred to as a "flow tube 28") configured to contain a fluid for passage along an axial axis of the flow tube 28. The flow tube 28 may comprise a metallic material. The flow tube 28 is typically cylindrical, but the present disclosure is not limited to a cylindrical cross-section flow tube 28. The strain sensors 26 are configured to sense unsteady pressures (e.g., associated with acoustic signals) within the fluid flow by sensing strain within the wall of the flow tube 28. The present disclosure is not limited to any particular type of strain sensor. Non-limiting examples of acceptable strain sensors 26 include piezoelectric sensors such as, but not limited to macro fiber composite (MFC) type sensors, piezoelectric film (PVDF) type sensors, etc. The sensor array 22 includes at least two sensors 26 axially spaced apart from one another. In many applications, an array 22 of eight sensors 26 axially spaced apart from one another is useful but the array 22 may include more or fewer sensors 26. The sensor array 22 may have a single sensor 26 at a given axial position ($X_1, X_2, X_3, \ldots X_N$) or it may include a plurality of sensors 26 disposed at a given axial position; e.g., two sensors 26 disposed at axial position $X_1$, two sensors 26 disposed at axial position $X_2$, two sensors 26 disposed at axial position $X_3$, etc. The sensor array 22 configurations disclosed in U.S. Patent Publication No. 2021/0010841, which is hereby incorporated by reference in its entirety, are examples of sensor arrays 22 that may be used with the present disclosure.

The strain sensor array 22 is in communication with the SA processing unit 24. Signals ($P_1(t)$-$P_N(T)$) representative of the sensed strain are provided by the sensors to the SA processing unit 24. The SA processing unit 24 may, in turn, process the sensor 26 signals and may determine a fluid flow parameter (e.g., SOS, convective velocity, etc.) of the fluid passing within the flow tube 28. Using a sensor array 22 to determine a fluid flow parameter of a fluid flow passing within a flow tube 28 is known, and the present disclosure is not limited to any particular device and/or methodology configured for the same. Acceptable devices and/or methodologies that may be used to determine the fluid flow parameter include those disclosed in U.S. Pat. No. 7,793,555 (hereby incorporated by reference in its entirety) and U.S. Patent Publication No. 2021/0010841. These devices/systems or the like may be modified according to aspects of the present disclosure to provide distinct advantage when used with a flow meter having one or more vibratable tubes 28 such as a Coriolis meter.

The SA processing unit 24 is in communication the sensor array 22 to control and/or receive signals therefrom to perform the functions described herein. In some embodiments, the SA processing unit 24 may be independent of the Coriolis meter 30 and can be configured to receive input from the Coriolis meter 30; e.g., drive coil 36 signals, pickoff coil 38 signals, etc. (e.g., see FIG. 6) In some embodiments, the SA processing unit 24 may be integral with a processing unit portion of a Coriolis meter 30 (i.e., a "CM processing unit 32"; see FIG. 6A). In some embodiments, the SA processing unit 24 and sensor array 22 may be part of a system 20 that includes Coriolis meter 30, and the Coriolis meter 30 and the SA processing unit 24 may be in communication with a system processing unit ("SYS processing unit 34"; see FIG. 6B). Any of these processing units 24, 32, 34 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system to accomplish the same algorithmically and/or coordination of system components. A processing unit 24, 32, 34 may include a single memory device or a plurality of memory devices. The present disclosure is not limited to any particular type of non-transitory memory device, and may include read-only memory, random access memory, volatile memory, nonvolatile memory, static memory, dynamic memory, flash memory, cache memory, and/or any device that stores digital information. A processing unit 24, 32, 34 may include, or may be in communication with, an input device that enables a user to enter data and/or instructions, and may include, or be in communication with, an output device configured, for example to display information (e.g., a visual display or a printer), or to transfer data, etc. Communications between a processing unit 24, 32, 34 and other system components may be via a hardwire connection or via a wireless connection.

Figure 2:
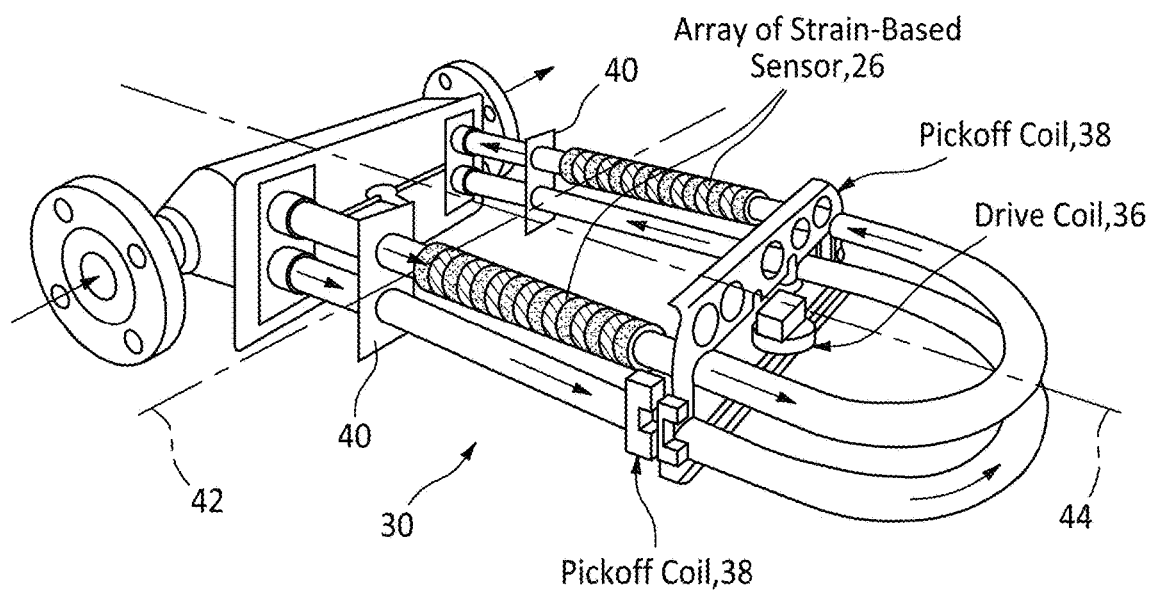
FIG. 2 is a perspective view of a dual, bent tube Coriolis meter with strain-based sensors disposed on a flow tube.

As indicated above, aspects of the present disclosure may be used with a Coriolis meter 30 or may be a system that includes a Coriolis meter 30. Coriolis meters are well-known and are available in a variety of different configurations; e.g., single or double bent tube Coriolis meters, straight tube Coriolis meters, etc. The present disclosure is not limited to any particular Coriolis meter 30 configuration. To facilitate the description herein, a non-limiting example of a dual bent tube Coriolis meter 30 is shown in FIG. 2 and described hereinafter. The Coriolis meter 30 includes a pair of bent tubes 28, an actuator (typically referred to as a "drive coil 36") and first and second motion sensors (typically referred to as a "pickoff coils 38"). The exemplary double tube Coriolis meter 30 shown in FIG. 2 further includes a pair of support flanges 40 that support the tubes 28 adjacent the pipe coupling portion of the Coriolis meter 30. The Coriolis meter 30 shown in FIG. 2 includes an array 22 of strain sensors 26, such as that described above, attached to a flow tube 28 of the Coriolis meter 30. The Coriolis meter 30 may be described as having an oscillating axis 42 located at the support flanges 40; i.e., the tubes 28 are cantilevered out from the support flanges 40 and may oscillate about the oscillating axis 42. The Coriolis meter 30 may also be described as having a twist axis 44 centrally located with respect to the flow tube 28 and generally perpendicular to the oscillating axis 42; i.e., the cantilevered tubes 28 may oscillate about the twist axis 44. During operation, the drive coil 36 is operated to drive a vibratory structural mode of the flow tubes 28 at resonance, and the pickoff coils 38 are configured to sense the motion of the respective tubes 28 and provide a signal representative of that motion. The Coriolis meter 30 measures the natural frequency of the flow tubes 28 to determine process fluid density and measures a phase lag associated with the twist of the tubes 28 to determine mass flow. The dominant structural vibration within the Coriolis flow tubes 28 is the intentionally driven vibration at a resonant frequency of flow tubes 28. The resonant frequency of the flow tubes 28 changes with operating conditions such as, but not limited to, any one of changes in process fluid density, the temperature of the flow tubes 28, fluid pressure within the flow tubes 28, or any combination thereof. The pickoff coils 38 sense the motion of the tubes 28 and provide signal feedback that may be used to maintain the tubes 28 at the resonant frequency. As stated above, the present disclosure is not limited to the exemplary double bent tube Coriolis meter 30 described above and shown within FIG. 1. Furthermore, Coriolis meters are well known in the art and therefore no further description is required herein to enable one skilled in the art.

During operation, dual bent tube Coriolis meters drive a vibratory structural mode of the flow tubes 28 at resonance. Since unintended vibration of the piping system in which the Coriolis meter 30 is installed can impair mass flow and/or density measurements, it is standard practice for Coriolis flow meters to be designed so that the flow tubes 28 are substantially structurally isolated from vibration of the piping network. The dominant structural vibration within the Coriolis flow tubes 28 is, therefore, the intentionally driven vibration at a resonant frequency of flow tubes 28.

Figure 3:
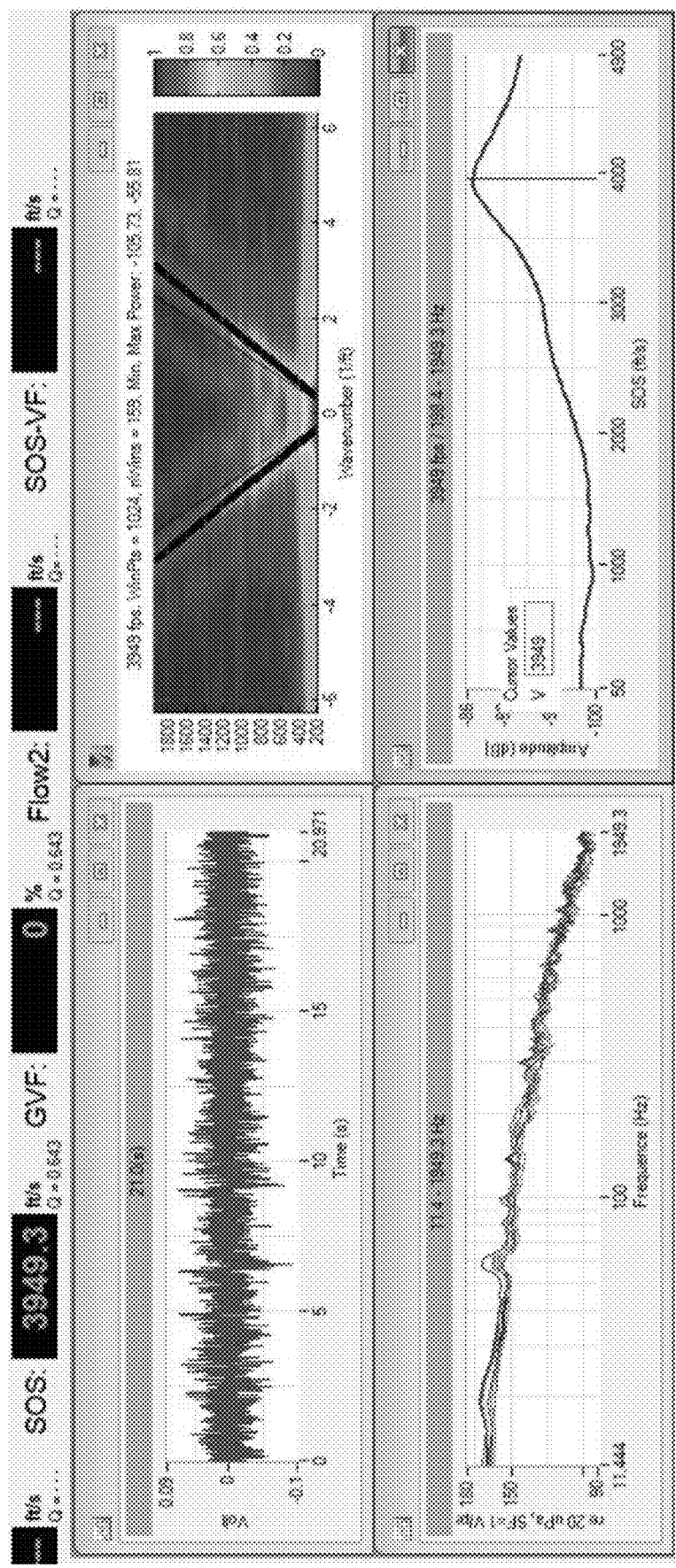
FIG. 3 illustrates diagnostics from SONAR processing of an array of strain-based sensors installed on a Coriolis flow tube with the Coriolis drive gain disabled, including a first window depicting a graph of speed of sound (SOS) time series data, a second window depicting a graph of SOS k-ω data, a third window depicting a graph of SOS power spectral density data, and a fourth window depicting a graph of SOS power data, as well as a SOS data value and a quality parameter data value.

FIG. 3 shows SONAR processing diagnostics from a strain sensor array 22 (e.g., eight (8) strain sensors 26) installed on a Coriolis flow tube 28 with the Coriolis transmitter disabled—i.e., the tubes 28 are not being driven by the Coriolis drive coil 36. The aforesaid SONAR processing diagnostics may be produced by the SA processing unit 24 in communication with the strain sensor array 22 based on the signals produced by the strain sensor array 22. FIG. 3 includes a first window depicting a graph of SOS time series data, a second window depicting a graph of SOS k-ω data, a third window depicting a graph of SOS power spectral density data, and a fourth window depicting a graph of SOS power data, as well as a SOS data value and a quality parameter data value. The diagnostic processing data shown in FIG. 3 is representative of water flowing through the flow tubes 28. Ambient noise propagating within the fluid passing through the flow tubes 28 is sensed by the strain sensor array 22 and measured by the SA processing unit 24. As indicated in the diagnostics display, the SOS within the process fluid is approximately thirty-nine hundred feet per second (3900 ft./sec). The SONAR processing diagnostics indicate a robust signal to noise conditions, with the quality parameter ("Q") indicated to be 0.643. The quality parameter is a non-dimensional value representative of the quality of the SOS measurement.

Figure 4:
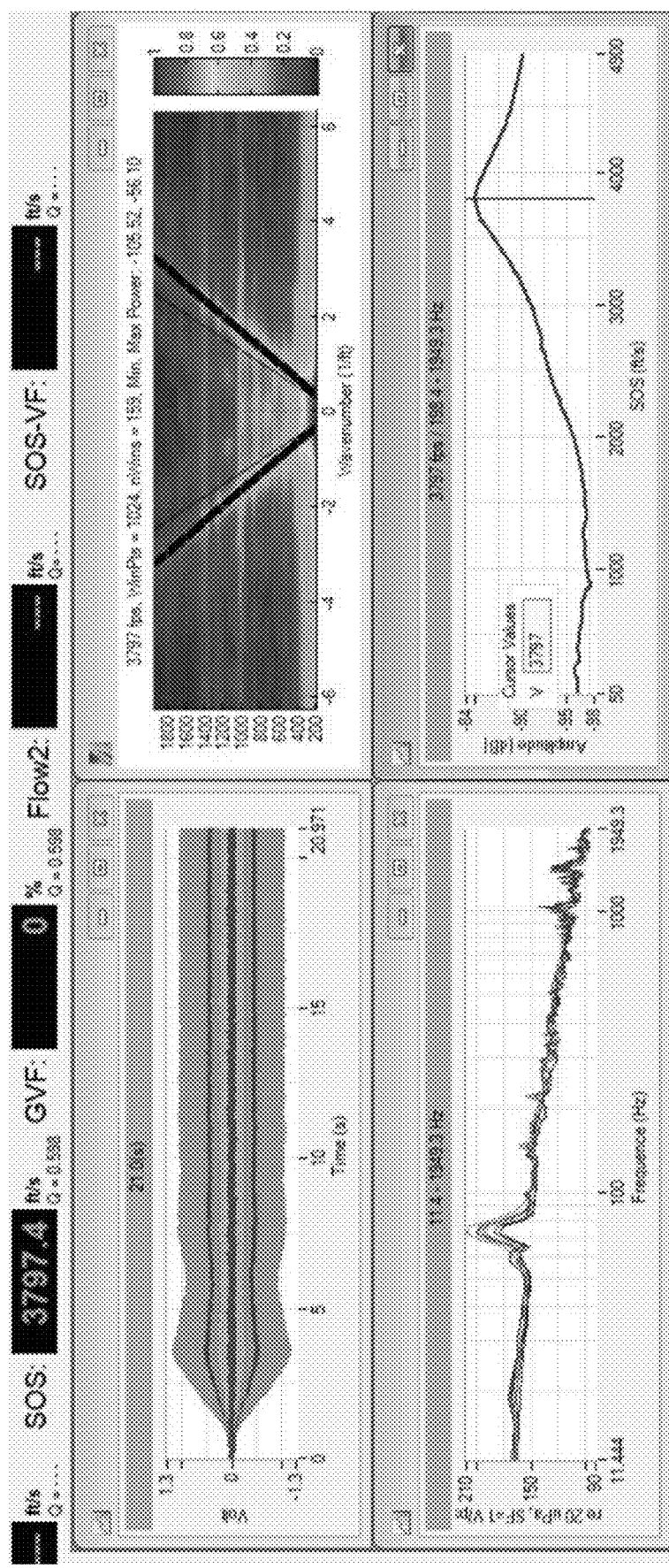
FIG. 4 illustrates diagnostics from SONAR processing of an array of strain-based sensors installed on a Coriolis flow tube with the Coriolis drive gain enabled, with windows of the type shown in FIG. 3.
Figure 5:
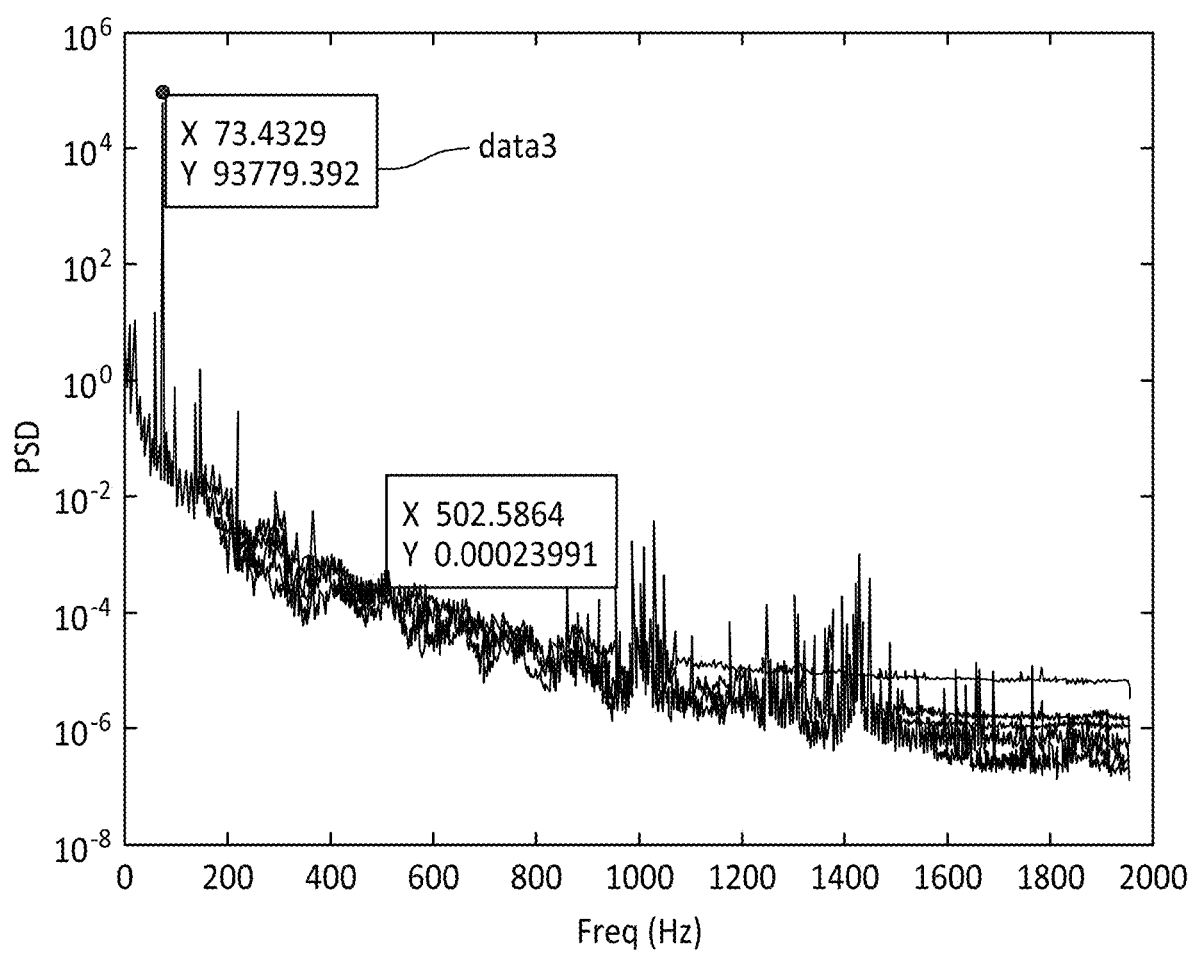
FIG. 5 is a graph illustrating power spectral density versus frequency of strain signals (pre-filtered) from an array of strain-based sensors (e.g., eight strain-based sensors) disposed on an operating Coriolis meter.

FIGS. 4 and 5 also shows SONAR processing diagnostics from a strain sensor array 22 (e.g., eight (8) strain sensors 26) installed on a Coriolis flow tube 28. In FIGS. 4 and 5, however, the SONAR processing diagnostics represent data collected during the start-up of a Coriolis meter drive gain; i.e., the drive coil 36 actuating the Coriolis meter 30 flow tubes 28. As can be seen in FIG. 4, a large tone is observed by the strain sensors 26 and the quality parameter representative of the quality of the SOS determination is reduced slightly; i.e., Q=0.598 in this example. Hence, the strain sensor array 22 is sensing strain associated with the Coriolis driven vibration as well as strain associated with ambient sound propagating within the process fluid as it passes through the tubes 28 by the array 22.

The portion of strain sensed by the strain sensor array 22 associated with the Coriolis driven vibration is typically orders of magnitude larger than the portion of strain associated with ambient sound propagating within the process fluid as it passes through the tubes 28 by the array 22. From an acoustic array processing perspective, the signal of interest for determining parameters of the process fluid (e.g., SOS, convective velocity, etc.) is typically within the frequency spectrum of about 100 Hz to about 2000 Hz. The present disclosure is not limited to this frequency spectrum, however. As indicated in the data shown in FIG. 5, a peak signal occurs at the flow tube 28 resonant frequency of 73.4 Hz. The legend shown in FIG. 5 illustrates data lines from each of the strain-based sensors within the array 22 (e.g., data1 from strain sensor 1, data2 from strain sensor 2 . . . data8 from strain sensor 8). The power spectral density at the resonant flow tube 28 frequency of 73.4 Hz has a relative amplitude of 94000 units for strain-based sensor #3; i.e., the strain-based sensor with the largest signal at flow tube 28 resonance. The tone at the resonant flow tube 28 frequency of 73.4 Hz is significantly larger than the tone at the broad band signals of interest around 500 Hz (i.e., within the range wherein signals of interest for determining fluid flow parameters). As indicated in FIG. 5, the broad band noise at 500 Hz has a power spectral density of 0.0002 units. The ratio in power spectral density between the tone at flow tube 28 resonance and the tone at the signal of interest is about $4\times10^8$ in power, or approximately 20,000 in amplitude.

This large difference in signal strength presents a signal processing challenge. Typically, analog signals are amplified to improve signal to noise ratios. The practically available amount of amplification is often limited by saturation. For the signal data shown in FIG. 5, the presence of the tone at 73.5 Hz (attributable to the Coriolis meter 30 drive) effectively limits the amplification of the higher frequency signals of interest (i.e., the signal range used for determining process fluid flow parameters). Although amplifiers are typically intended to be linear devices, non-linearities in the amplifier's gain characteristics can cause tones at one frequency to distort and introduce frequency content at frequencies well above and below the frequency of the tone. Also, array processing algorithms typically require signals to be digitalized. Analog-to-digital converters have a limited number of discrete values. Resolving the large amplitude tone reduces so called "bit" resolution available to resolve the lower amplitude signals of interest. Furthermore, frequency domain processing using finite window lengths typically exhibits leakage within the frequency domain. Leakage can result in strong tones at one frequency distorting information at other frequencies. Additionally, passive-listening, beam-forming-type SONAR processing algorithms are intended to measure sound waves that propagate within fluid passing through a pipe. This class of algorithms are not intended to, nor are they well-suited to, interpret strain resulting from Coriolis flow tube 28 driven vibration.

To overcome these factors, it was discovered to be highly advantageous to remove the tone at the resonant frequency of the flow tube 28 prior to amplification and digitization of the strain-based signals used to determine the SOS within the fluid, and therefore also prior to determining the SOS within the fluid in the flow tube 28.

A band-stop filter is a known conventional filtering technique that may be used to filter out a tone. While such a filter can effectively reduce a tone, these type filters typically introduce some gain and phase shift for frequency components "near" the band stop frequency. The exact gain and phase shift as a function of frequency will be determined by the exact parameters of the components used to create the filter. In many applications, small variations in the filter parameters are of little consequence. In sensor array processing, however, it is important to minimize any relative gain or phase shift introduced to the array of signals over the frequency range of interest. The gain and phase shift introduced by a "band-stop" type filter approaches zero for frequencies well-above and well-below the frequency of interest. What is "well-above" and "well-below" the frequency of interest may be measured in "decades", where the term "decade" indicates a frequency ratio of ten (10). If the frequency range of interest is several decades above or below the unwanted tone within an array of signals, the tone may be effectively eliminated by band pass filtering each signal within the array of signals with a band-pass filter with nominally the same parameters. However, if the signal range of interest is sufficiently close to the band-stop region, slight variations in the components used in each filter may introduce undesirable relative gain and phase lags among the strain-based sensors within the sensor array 22 and impair the ability of sonar processing techniques to determine propagation velocity.

Aspects of the present disclosure include an apparatus, a system, and a method that uses information from the signals generated by the Coriolis flow meter to remove signal content at specific frequencies to improve the ability of the SONAR processing techniques used with the sensor array 22 to accurately determine the speed of propagating sound waves within the process fluid passing in a flow tube 28 undergoing a significant vibratory motion; i.e., within a Coriolis meter 30 flow tube driven by a drive coil 36. The present disclosure overcomes or significantly mitigates the distortion issues associated with known signal filters. The term "remove" as used herein with regard to removing signal content at specific frequencies includes removing all of the identified signal content, or substantially all of the identified signal content.

Figure 6:
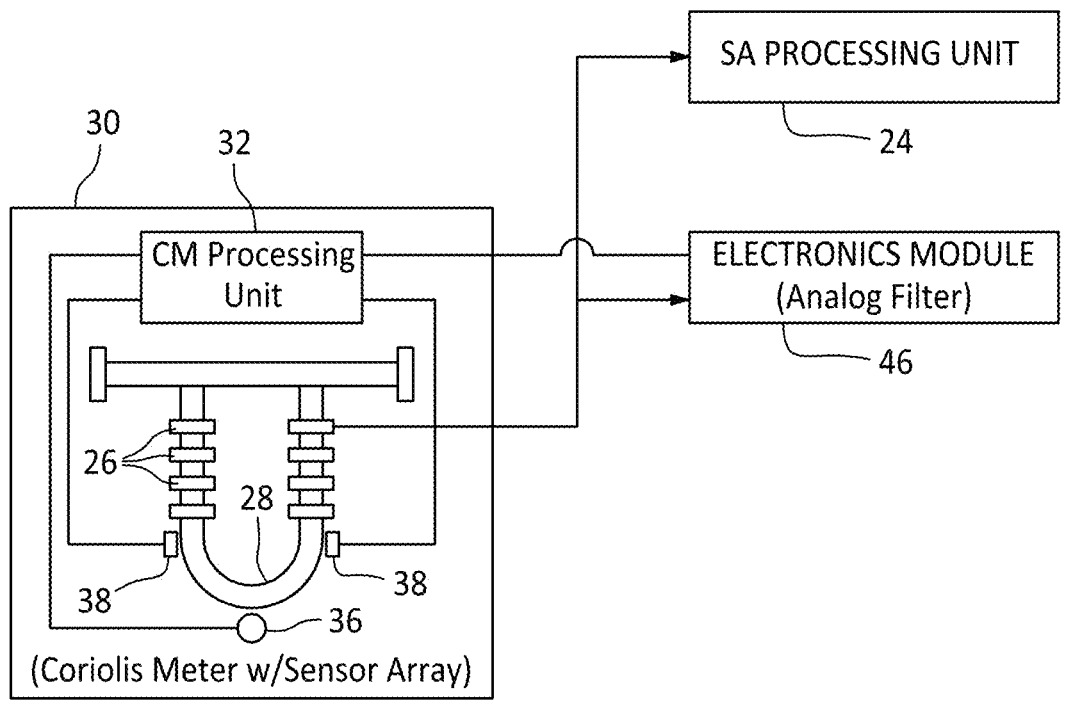
FIG. 6 is a schematic diagram of an exemplary embodiment of the present disclosure.
Figure 6A:
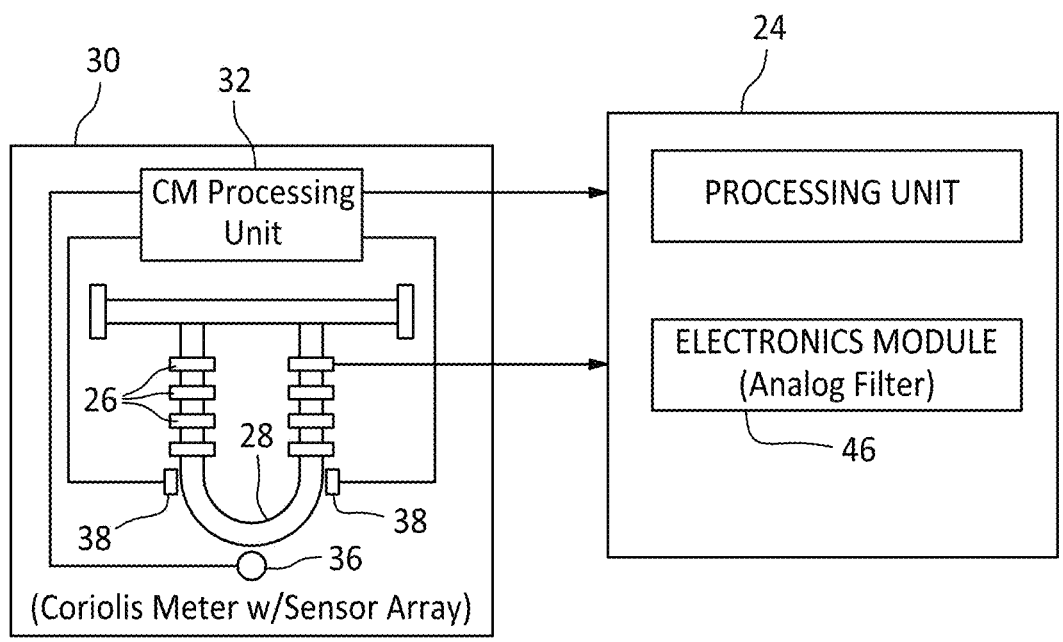
FIG. 6A is a schematic diagram of an exemplary embodiment of the present disclosure.
Figure 6B:
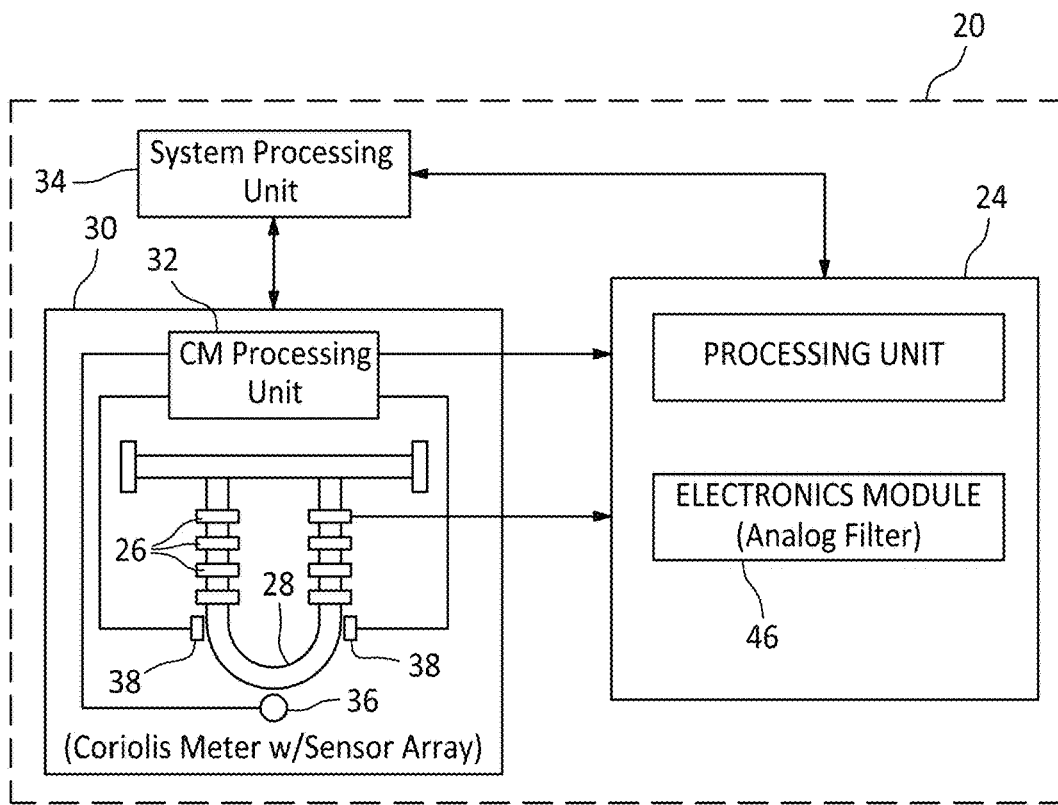
FIG. 6B is a schematic diagram of an exemplary embodiment of the present disclosure.

FIGS. 6-6B show exemplary schematics of a present disclosure embodiment with a sensor array 22 disposed on a flow tube 28 of a Coriolis meter 30, an electronic filtering module 46 (e.g., analog filter), and an SA processing unit 24 according to aspects of the present disclosure. In FIG. 6, an SA processing unit 24 is schematically shown as a component independent of the electronic filtering module 46. In FIG. 6A, a processing unit and the electronic filtering module 46 are schematically shown inside of a block labeled as the SA processing unit 24; i.e., symbolizing that the processing unit associated with the sensor array 22 and the electronic filtering module 46 (e.g., analog filter) may be configured as a combined unit. In FIG. 6B, the SA processing unit 24, the electronic filtering module 46, and the Coriolis meter 30 are schematically shown inside of a block depicting a system 20 that includes these elements. The present disclosure is not limited to any of these exemplary embodiments.

In some embodiments, a signal from one or both pickoff coils 38 of the Coriolis meter 30 may be used as the signal on which to project the output of each strain-based sensor 26 to identify and reconstruct the component of the strain-based sensor signal associated with the drive signal. In other embodiments, a signal from the drive coil 36 of the Coriolis meter 30 may be used as the signal on which to project the output (e.g., $P_N(t)$) of each strain-based sensor 26 to identify and reconstruct the component of the strain-based sensor signal associated with the Coriolis meter 30 drive signal (e.g., the pickoff coil 38 signals, the drive coil 36 signal, etc.). In still other embodiments, a produced signal (e.g., a sine wave signal or the like) may be used as the signal on which to project the output (e.g., $P_N(t)$) of each strain-based sensor 26 to identify and reconstruct the component of the strain sensor signal associated with the Coriolis meter 30 drive signal. In still other embodiments, one or more of the strain-based signals from the sensors 26 may be used as the signal on which to project the output of each strain-based sensor 26 to identify and reconstruct the component of the strain-based sensor signal associated with the drive signal. The present disclosure is not limited to the above signal examples.

As discussed herein, the PSD versus frequency graph shown in FIG. 5 has one predominant tone at the resonant frequency of 73.4 Hz and that tone possesses significantly larger power than any tones associated with broad band signals of interest around 500 Hz; i.e., within the range wherein signals of interest for determining fluid flow parameters. The present disclosure provides a means for removing that resonant tone to facilitate the processing of signals of interest that occur at substantially lower power levels with advantageously low levels of distortion. Hence, the present disclosure is described herein in terms of a single tone. The present disclosure is not, however, limited to a addressing a single tone that may be produced by a single frequency Coriolis meter 30. The present disclosure may also be utilized in instances where it is desirable to remove more than one high power tone; e.g., the present disclosure may be utilized with dual frequency Coriolis meters in the same manner described herein. Indeed, the present disclosure may be utilized to filter any number of the strain-based signals prior to performing the SONAR array processing.

As indicated above, the large difference in signal strength between the resonant frequency tone associated with the Coriolis meter 30 and any tones associated with broad band signals of interest for fluid flow parameter (e.g., SOS, convective velocity, etc.) presents a signal processing challenge. Also as indicated above, it was discovered to be highly advantageous to remove the tone at the resonant frequency of the flow tube 28 prior to amplification and digitization of the strain-based signals used to determine the fluid parameter(s) via the sensor array 22, and therefore also prior to determining the fluid parameter. Removing the resonant tone prior to amplification may minimize non-linearities associated with amplification of the tone. Removing the resonant tone prior to digitization may enable higher digital resolution for the acoustic signals of interest. Removing the tone prior to digitalization may also mitigate the impacts of leakage of the tone into other frequency bins due to finite window lengths.

The following example is provided to illustrate the operation and utility of the present disclosure. While this particular example does not illustrate all embodiments of the present disclosure, it does provide a useful illustration of the present methodology and also illustrates some benefits of the present disclosure.

As an example, a strain sensor 26 signal to be filtered may be multiplied by a cosine wave signal at the frequency that is to be removed (i.e., the frequency of the tone) to form what may be referred to as a "cosine projection". In similar fashion, the strain sensor signal to be filtered may be multiplied by a sine wave signal at the frequency that is to be removed to form what may be referred to as a "sine projection". In this example, the strain based signals (i.e., "p(t)") are multiplied by a sine wave and a cosine wave generated at the frequency of the tone (i.e., "$f_{tone}$") as observed in the power spectral density shown in FIG. 5; e.g., 73.45 Hz to form the projected signal:

$$F(t) = p(t)\cos(2\pi f_{tone} t) \qquad \text{(Eqn. 1)}$$

$$G(t) = p(t)\sin(2\pi f_{tone} t) \qquad \text{(Eqn. 2)}$$

where time is a discretized vector from zero to max(time) by delta time, and "p" is the pressure (strain) measured each time. For example, if time is a vector 10,0000 samples in length, p(t) is a 10,000 sample vector, and F(t) is a 10,000 sample vector formed by multiplying the corresponding elements of p(t) and the $\cos(2\pi f_{tone} t)$.

Figure 7:
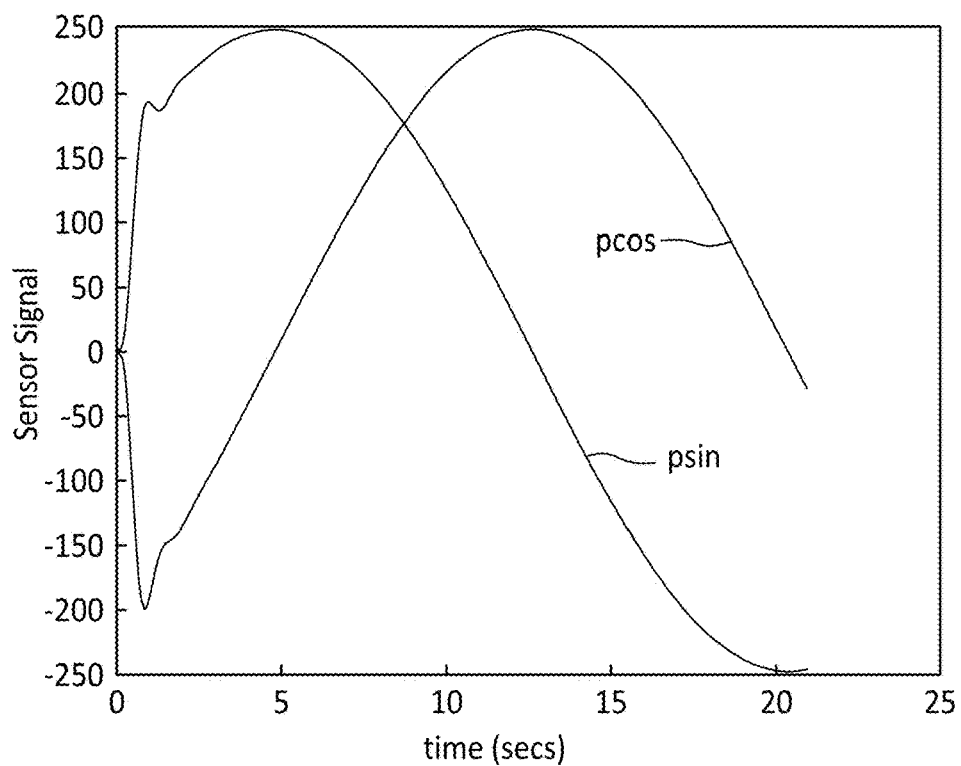
FIG. 7 is a graph illustrating a Fourier projection of signal from a strain-based sensor within the array of strain-based sensors versus sine and cosine functions generated at a drive signal.

These projections (i.e., F(t) and G(t)) are then low pass filtered and the result for this example is shown in FIG. 7; i.e., a Fourier projection of the signals from Sensor #3 in the Sensor array 22 versus a sine and cosine function at 73.45 Hz. The projections vary with time presumably due to a slight mismatch in the prescribed and constant frequency tone compared to the actual dominant tone produced by the potentially frequency varying signal driving the Coriolis flow tube 28 vibration.

In mathematical terms, a low pass filter may be implemented as follows:

$$F(n)_{lp} = \frac{\left(\frac{1}{N_{lp}}\sum_{m=n-N_{lp}+1}^{m=n} hanning_{N_{lp}}(m-(n-N_{lp})) * F(m)\right)}{\frac{1}{N_{lp}}\sum_{k=1}^{k=N_{lp}} hanning_{N_{lp}}(k)} \qquad \text{(Eqn. 3)}$$

where:

$$Fs = \frac{1}{(t(2) - t(1))} \qquad \text{(Eqn. 4)}$$

is the sample frequency in Hz;
$F(n)_{lp}$ is the approximate low pass frequency in Hz;

$$N_{lp} = \text{round}\left(\frac{(Fs)}{F(n)_{lp}}\right) \qquad \text{(Eqn. 5)}$$

and is the number of samples in the averaging process to implement a low pass filter. For a Coriolis meter 30, testing to date indicates that a low pass frequency of about 10 Hz is useful. The "$hanning_{Nlp}$" vector that represents a Hanning window of length $N_{lp}$ may be defined as follows:

$$hanning_{N_{lp}}(n) = \frac{1 - \cos\left(\frac{2\pi n}{N_{lp}}\right)}{2} \qquad \text{(Eqn. 6)}$$

As indicated above, the projections vary with time presumably due to a slight mismatch in the prescribed and constant frequency tone compared to the actual dominant tone produced by the potentially frequency varying signal driving the Coriolis flow tube 28 vibration.

The component of signal coherent with the tone may then be reconstructed using the formula:

$$p_{tone}(t) = 2F(t)\cos(2\pi f_{tone}) + 2G(t)\sin(2\pi f_{tone}) \qquad \text{(Eqn. 7)}$$

The reconstructed tone is then subtracted from the original signal, resulting in a strain-based signal with the component of the associated drive tone removed.

Figure 8:
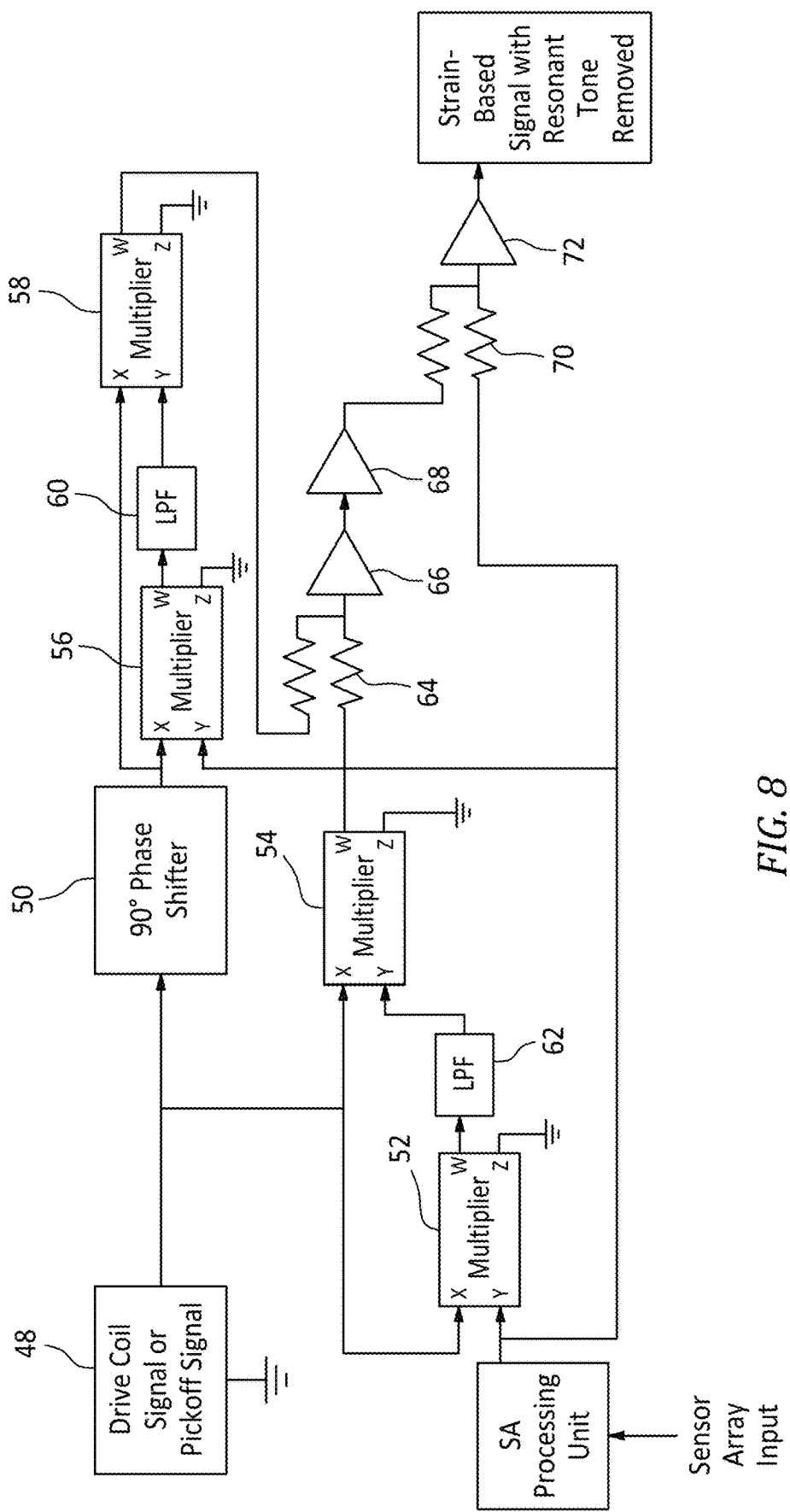
FIG. 8 is a schematic of an exemplary electronic filtering module; e.g., an analog drive tone removal filter.

FIG. 8 is a schematic representation of a non-limiting example of an electronic filtering module 46 (e.g., analog drive tone removal filter). Block 48 represents the drive signal which may be from the Coriolis meter 30 (e.g., the pickoff coil 38 signals, the drive coil 36 signal, etc.) or a produced signal. The drive signal is communicated to a 90 degrees phase shifter (block 50) and to a first multiplier (block 52) and a second multiplier (block 54). The drive signal may be considered to be in a sinusoidal form. The phase shifter (block 50) produces a phase shifted form of the drive signal, now in co-sinusoidal form. The co-sinusoidal signal from the phase shifter is communicated to a third multiplier (block 56) and a fourth multiplier (block 58). The third multiplier (block 56) also has an input from the SA processing unit 24 (i.e., ("$P_N(t)$"). A first low pass filter (block 60) is disposed between the third multiplier (block 56) and the fourth multiplier (block 58). Collectively, the third multiplier (block 56), the first low pass filter (block 60), and the fourth multiplier (block 58) produce the "G(t)"

signal described above in Equation 2. As indicated above, the first multiplier (block 52) receives a drive signal input. The first multiplier also receives an input from the SA processing unit 24 (i.e., ("$P_N(t)$"). The signal output from the first multiplier (block 52), which may be considered to be in a sinusoidal form, is communicated to a second low pass filter (block 62) and subsequently to the second multiplier (block 54). The second multiplier (block 54) also receives an input signal from the first multiplier (block 52). Collectively, the first multiplier (block 52), the second low pass filter (block 62), and the second multiplier (block 54) produce the "F(t)" signal described above in Equation 1. The "F(t)" and "G(t)" signals are subsequently passed through resistors 64 prior to being input into a non-inverting summer (block 66). The output of the non-inverting summer (block 66) is subsequently communicated as input to an inverting gain amplifier (block 68). The output of the inverting gain amplifier (block 68) and signal from the SA processing unit 24 (i.e., ("$P_N(t)$") are passed through resistors 70 and are input into a non-inverting summer (block 72). The output of the non-inverting summer (block 72) is a strain-based signal with the resonant drive tone removed, which may be subsequently processed (e.g., by the SA processing unit 24 or the like) to produce a fluid flow parameter (e.g., SOS, convective velocity, etc.). The fluid flow parameter may subsequently be used to facilitate operation of the Coriolis meter 30; e.g., to facilitate fluid density and/or mass flow determinations of an aerated fluid flow, or the like. To be clear, the above electronic filtering module description is provided to illustrate an example of an analog filtering device and the present disclosure is not limited thereto.

Figure 9:
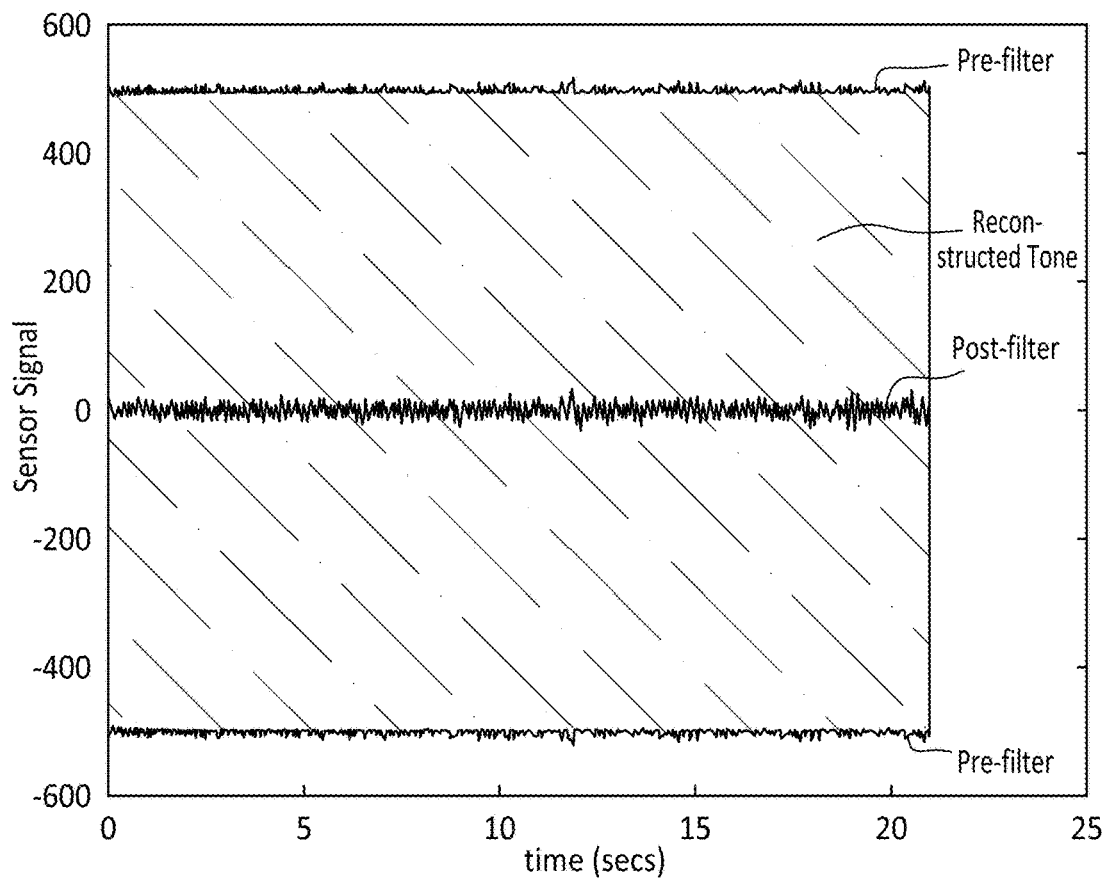
FIG. 9 is a graph illustrating signals from the strain-based sensor within the array of strain based sensors showing the analog pre-filtered signal, the component that is associated with a prescribed (reconstructed) tone, and a post-filtered signal.
Figure 10:
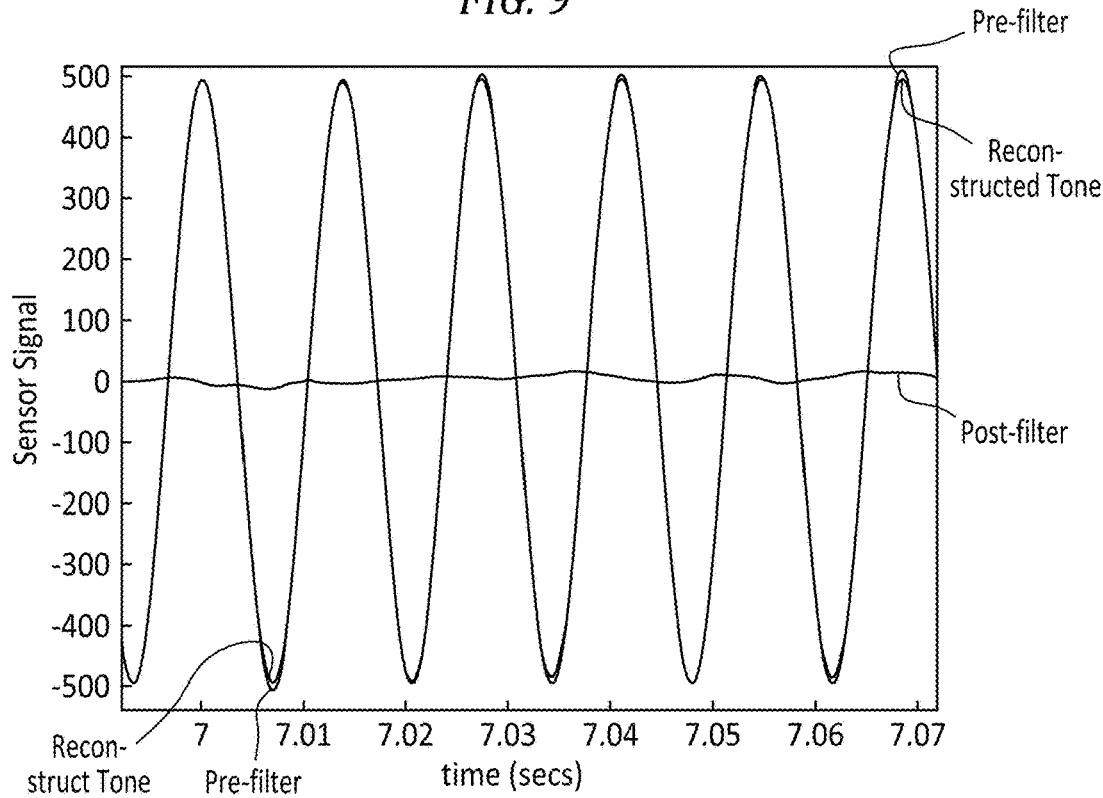
FIG. 10 is an enlarged view of a portion of the plot shown in FIG. 9.

FIG. 9 shows an example of the tone filtering process for the signal from array strain Sensor #3 of the eight sensor array 22, including the pre-filtered signal, the component of the signal associated with a prescribed drive tone (i.e., the "reconstructed tone"), and the signal with the tone removed (i.e., "post-filter"). FIG. 10 shows an enlarged portion of the three signals from FIG. 9.

Figure 11:
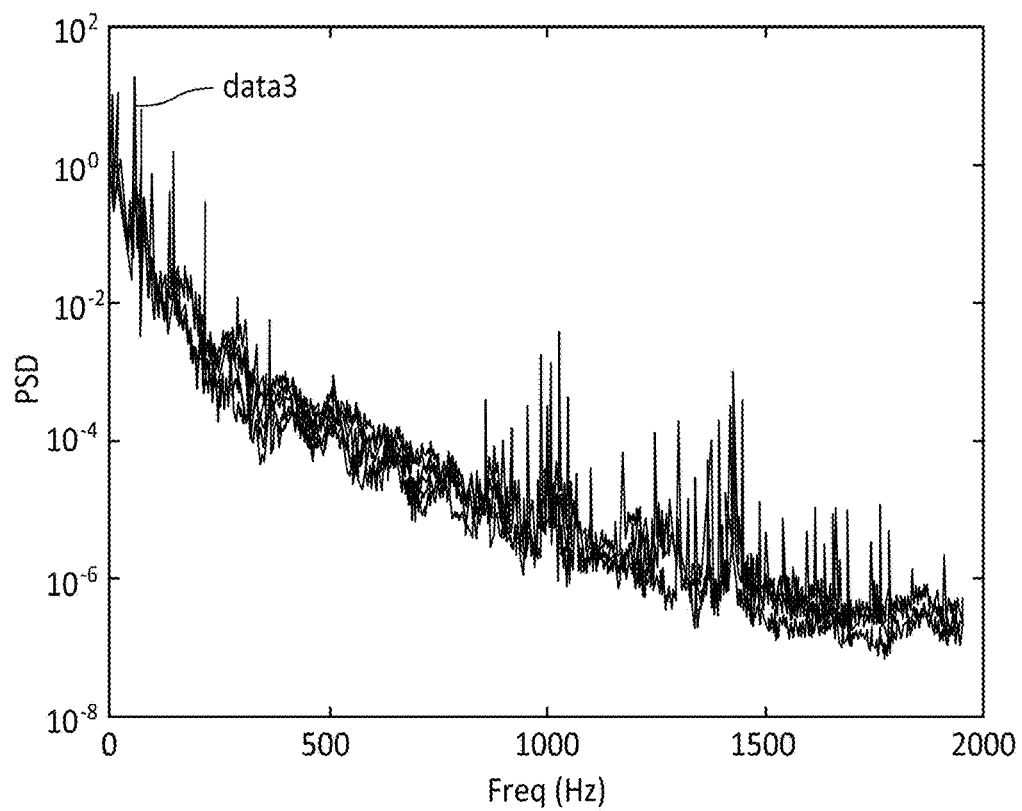
FIG. 11 is a graph illustrating the power spectral density (PSD) of the post-filtered analog signals from the sensor array with the portion of the signals associated with the drive tone removed.

FIG. 11 shows the post-filter power spectral density of all of the array strain sensors 26 (e.g., all eight sensors in the exemplary array 22). The present disclosure teaches that these post-filtered signals may be processed with a SONAR processing algorithm to determine a fluid flow parameter (e.g., SOS, convective velocity, etc.) of the process fluid passing within the flow tube 28. U.S. Pat. Nos. 7,322,245; 7,328,113; and 7,165,464 all discloses examples of SONAR processing algorithms that may be used with the present disclosure; each of these patents is hereby incorporated by reference in its entirety. The present disclosure is not limited to using any particular SONAR processing algorithm.

Figure 12:
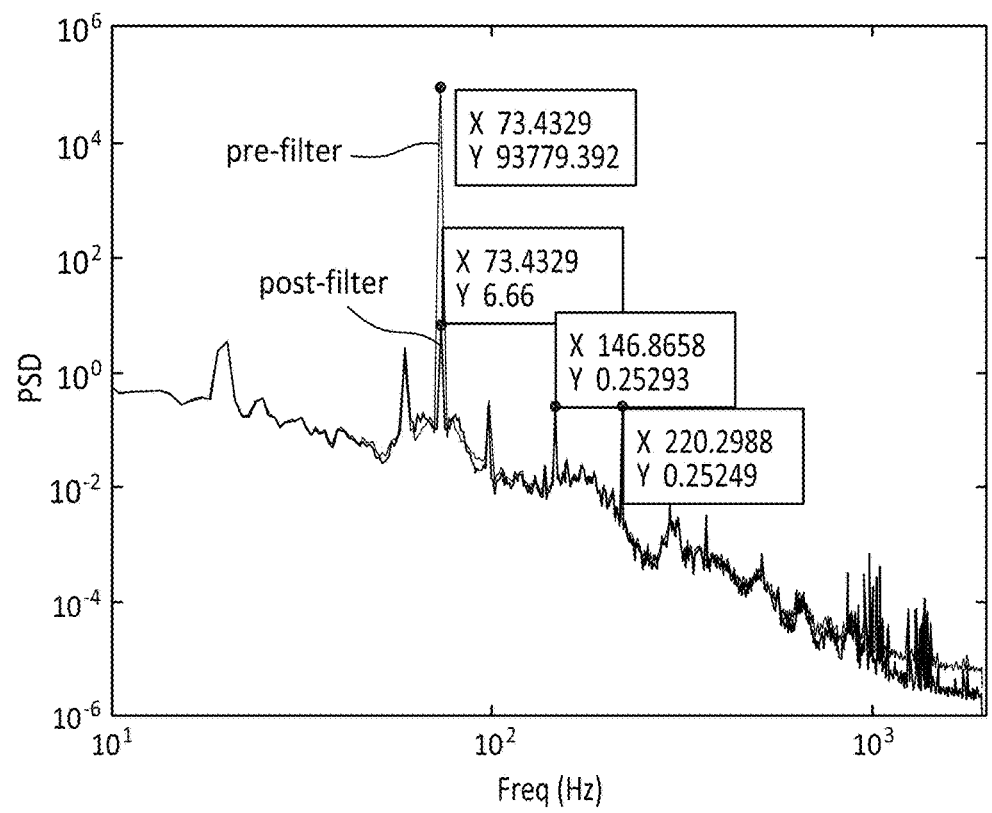
FIG. 12 is a graph illustrating a comparison of pre-filtered and post filter Power Spectral Densities of the strain-based sensor within the strain-based sensor array associated with the drive tone.

FIG. 12 shows a graphed comparison of the pre-filtered and the post-filtered signal from strain Sensor #3. It shows the signal is reduced at the drive tone frequency and over a relatively wide range of frequencies in which the frequency of the dominant drive tone (i.e., the drive signal) corrupts the signals from the sensor array 22. As indicated, the power spectra of the primary tone at strain Sensor #3 was reduced a factor of by approximately 10000, corresponding to an amplitude reduction of a factor of approximately 100. FIG. 12 shows the higher harmonics of the primary drive tone remaining in the filtered signal. This is in part due to the use of prescribed, generated, single frequency tone to perform the Fourier projection. If the higher harmonic content is present in the driving signal or the vibratory response of the flow tube 28, this tone may be reduced or mitigated using the projection procedure described herein. Also, as indicated above the present disclosure process described herein could be used to remove one or multiple tones successively.

Figure 13:
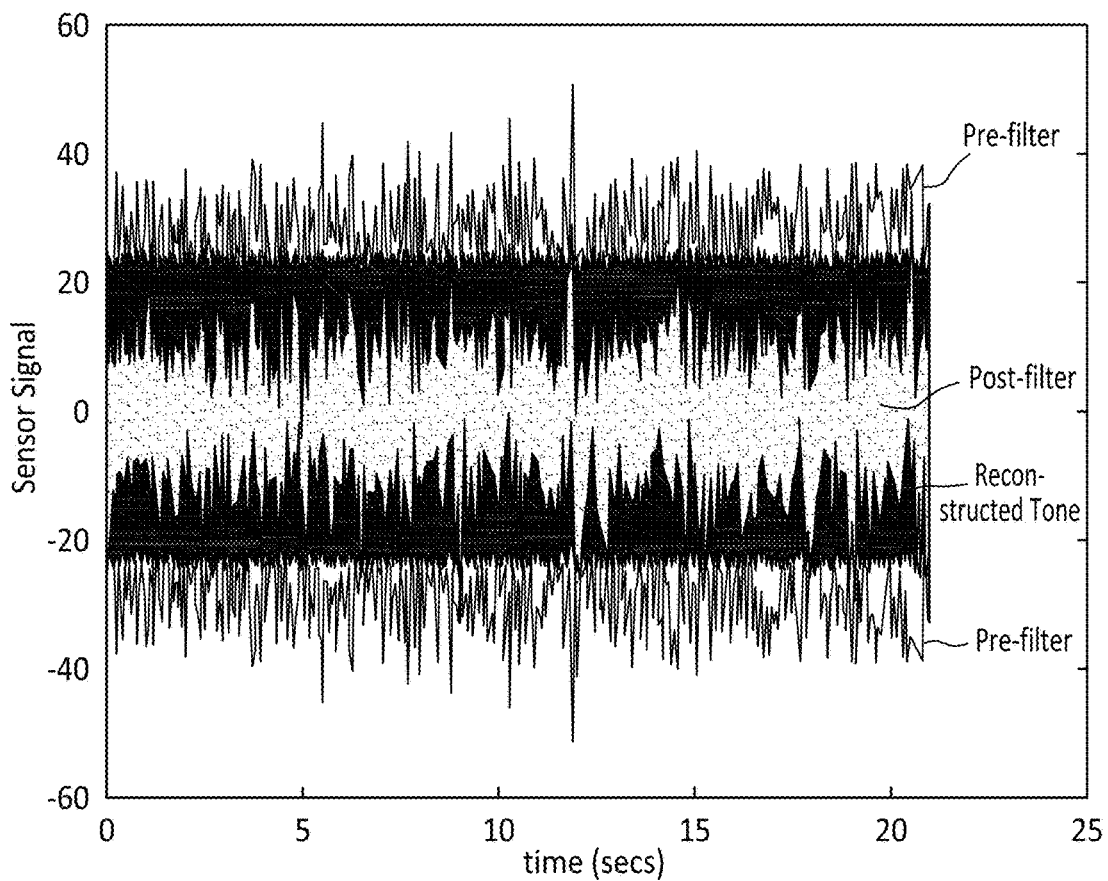
FIG. 13 is a graph illustrating the analog pre-filtered, identified component associated with the drive tone, and the post-filtered signals for another strain-based sensor (e.g., sensor #1) within the array of strain-based sensors.
Figure 14:
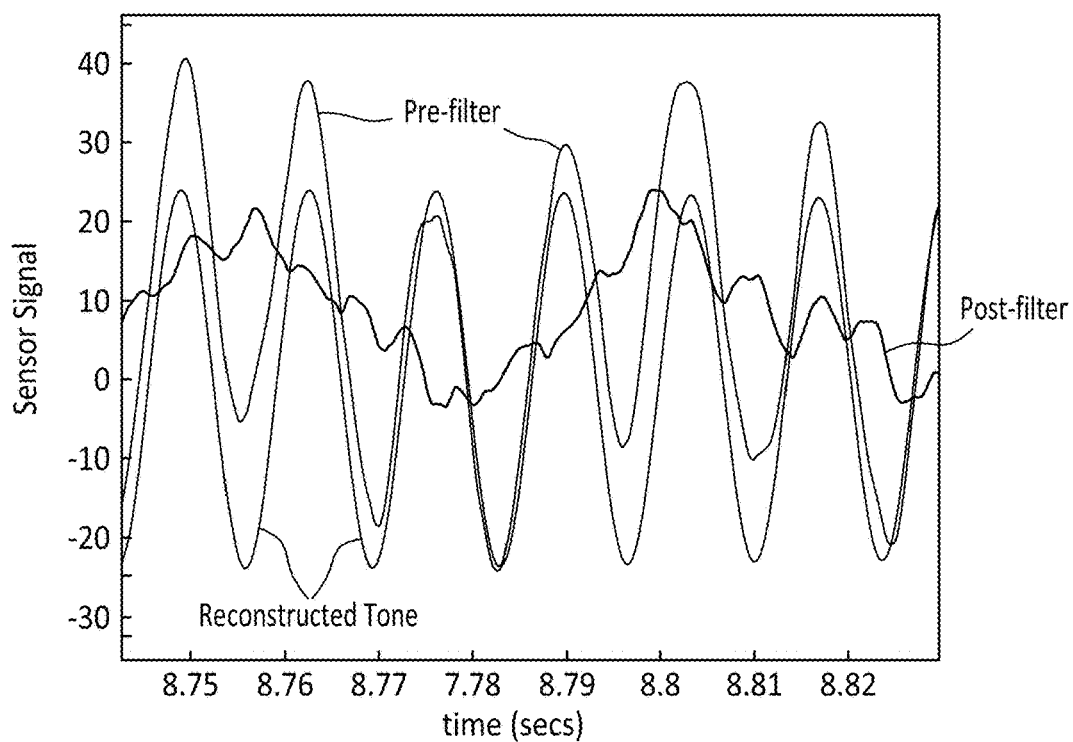
FIG. 14 is an enlarged view of a portion of the plot shown in FIG. 13.

FIG. 13 shows an example of the tone filtering process for the signal from array strain Sensor #1, showing the pre-filtered signal, the component of the signal associated with a prescribed tone, and the signal with the prescribed tone filtered out. The prescribed tone is greatly reduced in array strain Sensor #1 signal compared to the signal produced by array strain Sensor #3 due to the reduced strain associated with the primary vibratory mode of the flow tube 28. FIG. 14 shows an enlarged portion of the signal data shown in FIG. 13.

Figure 15:
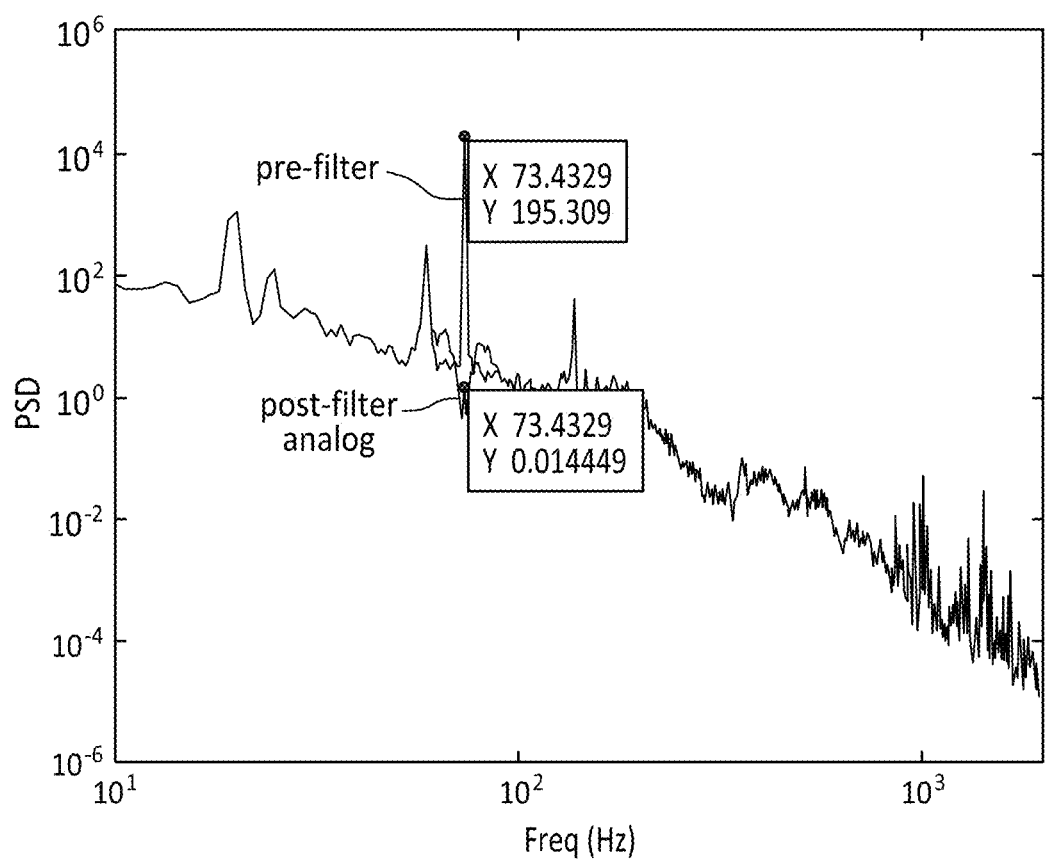
FIG. 15 is a graph illustrating the pre-filtered and post-filtered PSD for the other strain-based sensor (e.g., sensor #1), showing a case where tone leakage appears insignificant.

FIG. 15 shows the pre-filtered and the post-filtered power spectral density of array strain sensor #1. The tone is less dominant in array strain sensor #1 than in array strain sensor #3 and the impact of tone leakage is less significant. For array strain sensor #1, the tone is reduced by a power of about 10000, or an amplitude of about 100, similar to the reductions observed on array strain sensor #3.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

Additionally, even though some features, concepts, or aspects of the disclosures may be described herein as being a preferred arrangement or method, such description is not intended to suggest that such feature is required or necessary unless expressly so stated. Still further, exemplary, or representative values and ranges may be included to assist in understanding the present application, however, such values and ranges are not to be construed in a limiting sense and are intended to be critical values or ranges only if so expressly stated.

The invention claimed is:

1. A Coriolis meter, comprising:
   a flow tube configured to contain a fluid flow there through;
   a drive coil in communication with the flow tube and configured to drive the flow tube to vibrate at at least one resonant frequency of the flow tube;
   at least one tube motion sensor configured to sense vibratory motion of the flow tube;
   an array of strain-based sensors configured for sensing the flow tube, the array having at least one first strain-based sensor and at least one second strain based sensor, the array mounted on the flow tube with the at least one first strain-based sensor disposed at a first axial position and the at least one second strain based sensor disposed at a second axial position, the first axial position and the second axial position spaced apart from one another, the strain-based sensors configured to produce sensor signals representative of an amount of strain within the flow tube;
   an electronic filtering module; and
   a sensor array processing unit having a processor, the sensor array processing unit in communication with the array of sensors and a memory device storing executable instructions, wherein the instructions when executed cause the processor to control the array of strain-based sensors to produce the sensor signals representative of the amount of strain within the flow tube, the amount of strain including a first portion associated with the flow tube vibrating at at least one resonant frequency of the flow tube containing the fluid flow and a second portion associated with a fluid flow passing through the flow tube of the Coriolis meter;
   wherein the electronic filtering module is in communication with the sensor array and is configured to filter the sensor signals to remove a first sensor signal portion representative of the strain first portion associated with the flow tube vibrating at the at least one resonant frequency of the flow tube containing the fluid flow, the flow tube vibrating at the at least one resonant frequency as a result of the flow tube being vibrationally driven by the drive coil.

2. The Coriolis meter of claim 1, wherein the electronic filtering module is configured to receive signal input from at least one of the drive coil or the at least one tube motion sensor, and to filter the sensor signals using the signal input from the Coriolis meter.

3. The Coriolis meter of claim 2, wherein the electronic filtering module is configured to filter the sensor signals using a sine projection and a cosine projection.

4. The Coriolis meter of claim 3, wherein the cosine projection is $F(t)=p(t)\cos(2\pi f_{tone}t)$ and the sine projection is $G(t)=p(t)\sin(2\pi f_{tone}t)$ where $p(t)$ represents the sensor signals and $f_{tone}$ is one of the at least one resonant frequency of the flow tube.

5. The Coriolis meter of claim 1, wherein the electronic filtering module produces filtered signals representative of the sensor signals filtered to remove the first sensor signal portion representative of the strain first portion associated with the flow tube vibrating at the at least one resonant frequency of the flow tube; and
   the sensor array processing unit is configured to produce one or more fluid flow parameters using the filtered signals.

6. The Coriolis meter of claim 5, wherein the fluid flow parameter is at least one of a speed of sound or a convective velocity of the fluid flow.

7. The Coriolis meter of claim 1, wherein the electronic filtering module utilizes an analog circuit to remove the first sensor signal portion representative of the strain first portion associated with the flow tube vibrating at the at least one resonant frequency of the flow tube.

8. A system, comprising:
   a Coriolis meter having a flow tube configured to contain a fluid flow there through, a drive coil in communication with the flow tube and configured to cause the flow tube to vibrate at at least one resonant frequency of the flow tube, at least one tube motion sensor configured to sense vibratory motion of the flow tube, and a Coriolis meter processing unit;
   a flow meter having an array of strain-based sensors and a sensor array processing unit;
   wherein the array of strain-based sensors are disposed on the flow tube of the Coriolis meter, the array having at least one first strain-based sensor and at least one second strain based sensor, the at least one first strain-based sensor disposed at a first axial position on the flow tube and the at least one second strain based sensor disposed at a second axial position on the flow tube, the first axial position and the second axial position spaced apart from one another, the strain-based sensors configured to produce sensor signals representative of an amount of strain within the flow tube;
   wherein the sensor array processing unit has a processor, the sensor array processing unit in communication with the array of sensors and a memory device storing executable instructions, wherein the instructions when executed cause the processor to control the array of strain-based sensors to produce the sensor signals representative of the amount of strain within the flow tube, the amount of strain including a first portion associated with the flow tube vibrating at at least one resonant frequency of the flow tube containing the fluid flow and a second portion associated with a fluid flow passing through the flow tube of the Coriolis meter; and a system processing unit in communication with the Coriolis meter processing unit and the sensor array processing unit, the system processing unit including an electronic filtering module in communication with the sensor array processing unit and the Coriolis meter processing unit, the electronic filtering module configured to filter the sensor signals to remove a first sensor signal portion representative of the strain first portion associated with the flow tube vibrating at the at least one resonant frequency of the flow tube containing the fluid flow, the flow tube vibrating at the at least one resonant frequency as a result of the flow tube being vibrationally driven by the drive coil.

* * * * *